Nov. 6, 1928.  
W. F. RESCHKE  
1,690,794  
GRAIN RECEIVING ATTACHMENT FOR COMBINED HARVESTERS AND THRASHERS  
Filed Aug. 2, 1926
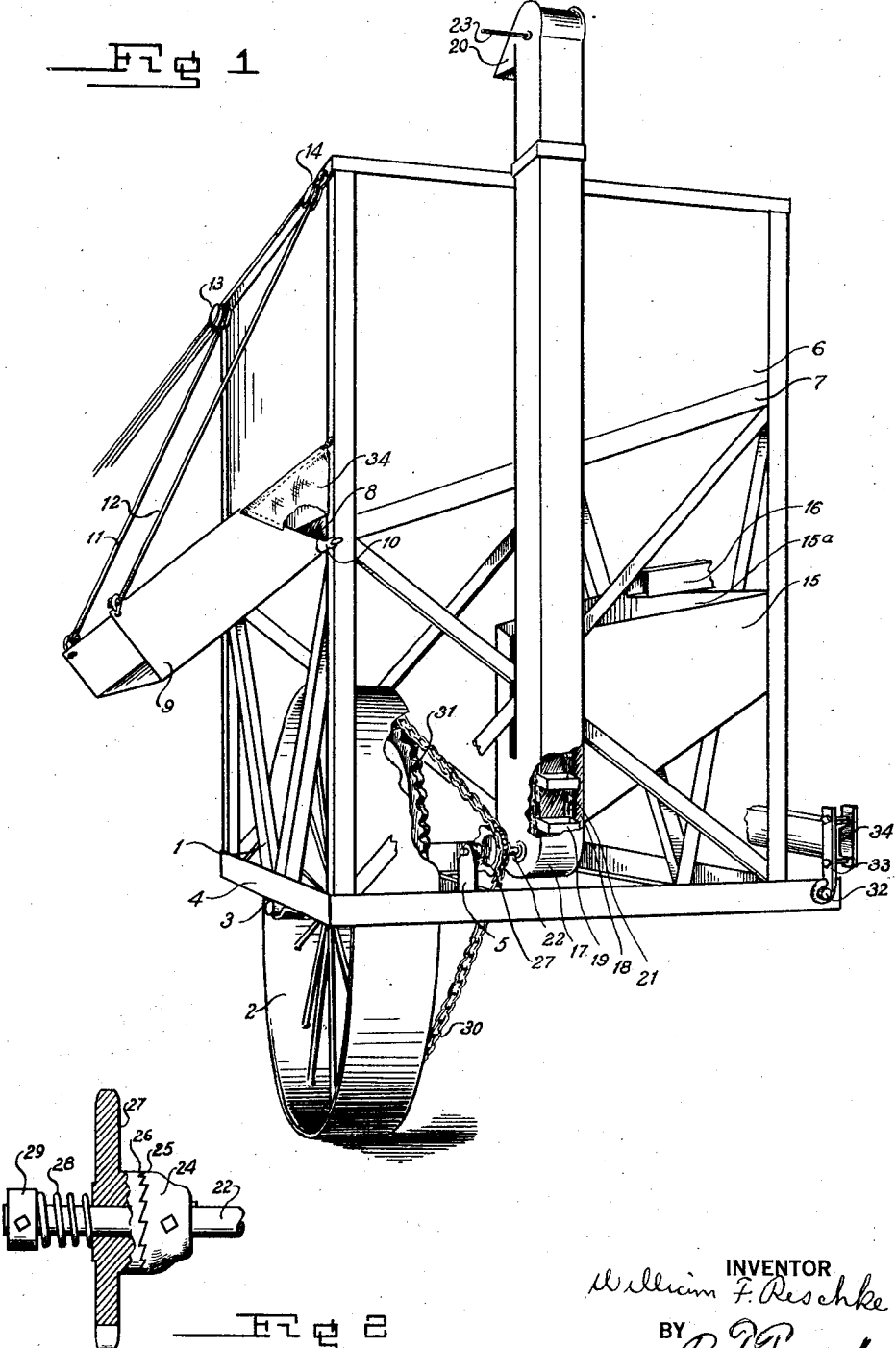

Patented Nov. 6, 1928.

1,690,794

UNITED STATES PATENT OFFICE.

WILLIAM F. RESCHKE, OF WICHITA, KANSAS.

GRAIN-RECEIVING ATTACHMENT FOR COMBINED HARVESTERS AND THRASHERS.

Application filed August 2, 1926. Serial No. 126,701.

This invention relates to grain tanks and particularly to that class of tanks used conjointly with combined grain harvesters and thrashers.

Primarily the grain tank is designed to receive the grain from the thrasher delivery mechanism of any combined grain harvester and thrasher while the harvester and thrasher is traveling through the field preparatory to delivering the grain into the body of a wagon, truck or similar receptacle so that the grain can be transported to bins or be delivered to cars for shipment.

Specifically the invention contemplates a wheeled frame adapted to be operatively connected to any combined harvester and thrasher, the frame being provided with a main tank and a subjacent tank of smaller capacity than the main tank, the subjacent tank receiving the thrashed grain from the delivery end of the harvester and thrasher and delivering it to the main tank through the medium of an elevator driven by a traction wheel supporting the frame.

The purpose of the subjacent tank is to provide means to receive grain from the thrasher when it is stationary and the main tank is delivering grain to the truck, wagon or other receptacle. This permits the thrashing to be continuous whether the thrasher is stationary or moving over the ground in contra-distinction to those tanks so constructed that the thrashing must cease when the tank is discharging grain.

My invention will be better understood by reference to the following description in connection with the accompanying drawing, in which—

Fig. 1 is a perspective view of a grain tank structure constructed in accordance with my invention, and Fig. 2 is a view partly in elevation and partly in section of the ratchet clutch connection between the drive sprocket and the drive shaft for the elevator.

Referring to the drawings by numerals of reference, 1 designates the frame which may be of any suitable construction, the frame being supported by a traction wheel 2 in any convenient manner. I have shown an axle 3 supported by the bars 4 and 5, about the axis of which the wheel 2 rotates.

Carried by the frame 1 is the main grain tank which consists of a hopper 6 with an inclined bottom 7 tending to direct the grain in the tank toward the elongated slot 8 and upon the floor of the chute 9 hinged to the tank at 10 so that the grain can be delivered to the body of the wagon, truck or other receptacle provided to receive it.

To the front end of the chute 10 are fastened two cables 11 and 12. To the upper part of the frame 1 are fastened two pulleys 13 and 14, the pulley 13 being a double pulley and the pulley 14 a single pulley. The cable 11 passes through the block of the double pulley 13 and the cable 12 passes through the single pulley 14 and also through the double pulley 13, both cables being within easy reach of the operator on the combined harvester and thrasher so that the chute 9 can have its front end elevated to valve off the grain from the hopper like tank 6 or depressed to allow the grain to flow.

Carried by the frame 1 is a sub-jacent tank 15 preferably of smaller capacity than the tank 6 and so located that grain can be transferred from the tank 15 into the tank 6 by means of an elevator driven from the traction wheel. The tank 15 has an open top along one edge 15ª the grain discharge spout 16 of the combined harvester and thrasher may play. The intake end 17 of the elevator 18 communicates with the lowest part of the sub-jacent tank 15 so that the grain will gravitate into the casing of the elevator from where it may be hoisted or elevated by the buckets 19 to the discharge end 20 above the top of the tank 6. The buckets 19 are carried on a belt 21 passing around pulleys (not shown) on the shafts 22 and 23, the shaft 22 being the drive shaft and 23 an idler.

On the shaft 22 is a ratchet clutch mechanism (best shown in Fig. 2). It consists of a collar 24 having ratchet teeth 25 which mesh with teeth 26 on sprocket 27 loose on shaft 22 and urged longitudinally of the shaft by an expansion spring 28 one end of which bears against a collar 29 fixed on the end of the shaft. The sprocket 27 is driven through the medium of a chain 30 engaged by the teeth of the relatively large sprocket 31 carried by the wheel 2. When the wheel 2 is moving in a forward direction the sprocket 27 will be clutched to the shaft 22 so that the elevator belt will be driven but when the wheel 2 is moving in a reverse direction the clutch will permit the sprocket 27 to slip so that the belt 21 will not be driven. This will be clearly apparent by reference to the drawings.

By reference to the drawings it will be apparent that the tank 15 has sufficient capacity so that when the combined harvester and thrasher is in a state of rest the thrasher may continue to operate and discharge into the tank 15 even while the tank 6 is discharging. The advantage of this is obvious.

Another advantage is that the elevator is driven from the traction wheel 2 so it will not be necessary to gear the elevator mechanism to any moving part of the combined harvester and thrasher, therefore the device shown can be sold as a complete unit adapted to be associated with any conventional combined harvester and thrasher.

At each end of the frame 1 is a pin 32 to which is hinged a strap 33 adapted to be fastened to the side rail 34 of a conventional combined harvester and thrasher thereby making a flexible connection, other connections may be employed however.

At the sides of the chute 9 are flexible webs 34 to act as guards to prevent the grain from spilling from the sides of the chute when it is being discharged.

What I claim and desire to secure by Letters-Patent is:—

1. An attachment for combined harvesters and thrashers comprising a frame, means for attaching the frame to a combined harvester and thrasher, a single wheel supporting the frame, a grain receiving tank carried by the frame, a grain delivery tank above the first named tank also supported by the frame, and a conveyer for delivering grain from the receiving tank to the delivery tank.

2. An attachment for combined harvesters and thrashers comprising a frame, means for attaching the frame to a combined harvester and thrasher, a single wheel supporting the frame, a grain receiving tank carried by the frame, a grain delivery tank above the first named tank also supported by the frame, a conveyer for delivering grain from the receiving tank to the delivery tank, and means driven by the wheel for operating the conveyer.

In testimony whereof I affix my signature.

WILLIAM F. RESCHKE.